United States Patent

Doscher

[15] 3,671,631

[45] June 20, 1972

[54] METHOD FOR CONTROL OF HELMINTHS IN WARM-BLOODED ANIMALS USING PHOSPHINYLDITHIOCARBAMATES.

[72] Inventor: Mary Ehlers Doscher, Trenton, N.J.

[73] Assignee: American Cyanamid Company, Stamford, Conn.

[22] Filed: April 15, 1971

[21] Appl. No.: 134,454

[52] U.S. Cl. ........................................................424/205
[51] Int. Cl. ....................................................A61k 27/00
[58] Field of Search..................................................424/205

[56] References Cited

UNITED STATES PATENTS 3,402,224  9/1968  Schicke ................................424/205
2,916,415  12/1959  Willard et al. ........................424/205

Primary Examiner—Sam Rosen
Attorney—Stephen Raines

[57] ABSTRACT

This invention relates to a novel method for controlling helminths in warm-blooded animals. More particularly, the invention relates to a method for the control of helminths in warm-blooded animals by administering to said animals, an anthelmintically effective amount of a compound of the formula:

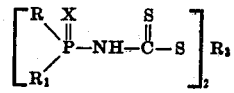

wherein R and $R_1$ are each members selected from the group consisting of loweralkyl, loweralkoxy and phenyl; X is sulfur or oxygen; and $R_3$ is a loweralkylene radical, such as ethylene, loweralkyl substituted ethylene, trimethylene, loweralkyl substituted trimethylene, oxydimethylene, tetramethylene or loweralkyl substituted tetramethylene.

10 Claims, No Drawings

METHOD FOR CONTROL OF HELMINTHS IN WARM-BLOODED ANIMALS USING PHOSPHINYLDITHIOCARBAMATES.

DETAILED DESCRIPTION OF THE INVENTION

The compounds of the present invention are described in U.S. Pat. application Ser. No. 58,677, filed July 27, 1970 which is a continuation-in-part of a U.S. Pat. application Ser. No. 640,836, filed May 24, 1967 now abandoned.

U.S. application Ser. No. 57,677, filed July 27, 1970 reports alkylene-bis-phosphinyldithiocarbamates to be highly effective plant pesticides and are particularly effective against insects and arachnids which ravage living plants. A new use, not suggested by the earlier application, as an anthelmintic in warm-blooded animals has now been found for alkylene-bis-phosphinyldithiocarbamates.

It has been found that alkylene-bis-phosphinyldithiocarbamates have relatively low mammalian toxicity and are highly effective against a variety of helminths in domestic, farm, fur and laboratory animals.

In general, the compounds which are useful in the method of the present invention, i.e., the treatment of warm-blooded animals to prevent, reduce and/or control helminth infestations in such animals, have the formula:

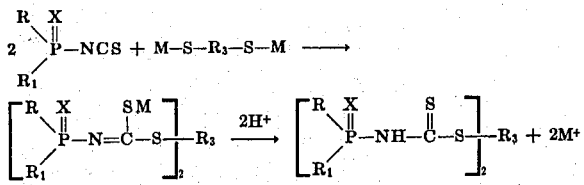

wherein R and $R_1$ are members selected from the group consisting of loweralkyl, loweralkoxy and phenyl; X is sulfur or oxygen; $R_3$ is ethylene, loweralkyl and substituted ethylene, trimethylene, loweralkyl substituted trimethylene, oxydimethylene, tetramethylene or loweralkyl substituted tetramethylene.

Such compounds are prepared by reacting a phosphinyl isothiocyanate of the formula;

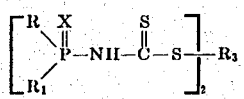

with the salt of an alkylene dithiol of the formula: M—S—$R_3$—S—M wherein M is an alkali metal, such as sodium, potassium, or lithium, or a trialkylammonium group to form an alkylene-bis-phosphinyldithiocarbamate salt. Upon acidification, the alkylene-bis-phosphinyldithiocarbamate thus formed is recovered. Approximately two moles of the isocyanate reactant are used per mole of the alkylene dithiol. However, the molar ratio may be varied somewhat without seriously altering product yield. Advantageously, the reaction can be carried out over a wide range of temperatures, usually between about 0° and 100° C., but it is preferred to conduct the reaction at a temperature between about 30° and 60° C. Graphically, the over-all reaction may be illustrated as follows:

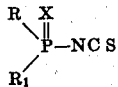

2 P—NCS + M—S—$R_3$—S—M ⟶

$$\left[ \begin{array}{c} R\quad X\quad\quad SM \\ \diagdown \| \quad\quad | \\ P—N=C—S—R_3 \\ \diagup \\ R_1 \end{array} \right]_2 \xrightarrow{2H^+} \left[ \begin{array}{c} R\quad X\quad\quad S \\ \diagdown \| \quad\quad \| \\ P—NH—C—S—R_3 \\ \diagup \\ R_1 \end{array} \right]_2 + 2M^+$$

wherein R, $R_1$, $R_3$, X and M are as hereinabove defined.

Illustrative of the alkylene-bis-phosphinyldithiocarbamates so prepared are: ethylene-bis-diethoxyphosphinyldithiocarbamate, methylene-bis-dimethoxyphosphinyldithiocarbamate, propylene-bis-diethylphosphinyldithiocarbamate, tetramethylene-bis-dibutoxyphosphinyldithiocarbamate, 1,2-butylene-bis-ethoxyphenylphosphinyldithiocarbamate, 2,3-butylene-bis-diethoxyphosphinyldithiocarbamate, 2,2-dimethyltrimethylene-bis-methylphenylphosphinyldithiocarbamate, ethylene-bis-diphenylphosphinyldithiocarbamate, methylene-bis-diethoxyphosphinothioyldithiocarbamate, propylene-bis-diethoxyphosphinothioyldithiocarbamate, ethylene-bis-phosphinothioyldithiocarbamate.

An alternative method of preparing the compounds of the present invention is to treat the phosphinyl isothiocyanates of the formula:

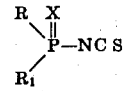

with an alkali metal hydrosulfide MSH; yielding the corresponding phosphinyldithiocarbamate salt:

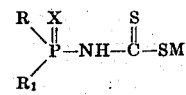

wherein R, $R_1$, and M are hereinabove defined. Where the latter salt is reacted with bis-chloromethyl ether and the reaction mixture acidified, there are formed oxydimethylene bis-phosphinyldithiocarbamates of the formula:

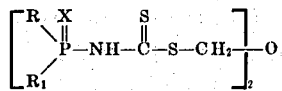

Illustrative of the oxydimethylene-bis-phosphinyldithiocarbamates so prepared are: oxydimethylene-bis-diethoxyphosphinyldithiocarbamate, oxydimethylene-bis-dimethoxyphosphinyldithiocarbamate, oxydimethylene-bis-dimethylphosphinyldithiocarbamate, oxydimethylene-bis-methoxyethylphosphinyldithiocarbamate, oxydimethylene-bis-diphenylphosphinyldithiocarbamate.

In practice, the active compounds are generally orally administered to host animals in a capsule, pill, bolus, tablet, drench or liquid formulation or added to or admixed with the feed. However, if desired, the compounds may also be administered by injection subcutaneously or intramuscularly. Among the animals which may be effectively treated with compounds of the present invention are cattle, sheep, dogs, goats, horses, rabbits, guinea pigs, swine, and foxes.

In addition, these compounds may be used in mixtures with other useful anthelmintic agents when administered to warm-blooded animals. Such combinations may result in obtaining a wider range of activity and add to convenience of administration. An example of one such useful combination is the combining of an alkylene-bis-phosphinyldithiocarbamate and m-aminotetramisole (imidazo[2,1-b]thiazole, 6-(m-aminophenyl)-2,3,5,6-tetrahydro-1-dihydrochloride). The methods of administration of the mixtures are the same as those listed for administering the alkylene-bis-phosphinyldithiocarbamate as a single active component.

Usually from about 2.5 to 30 mg. of the alkylene-bis-phosphinyldithiocarbamate per kg. of animal body weight and preferably 5.0 to 15 mg./kg. is effective for controlling helminthiasis in such animals. Treatment may conveniently be given as a single dose within the stated range or the dose may be reduced to from ½ to 1/20 of the above mentioned level and administered in multiple doses.

Although the compounds of the above-identified structure are useful in the treatment of a wide variety of animals, it is interesting to note that such compounds are particularly effective in Canidae treatment.

Compounds which are especially useful in the latter treatments are those of the formula:

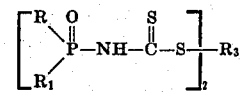

wherein R and $R_1$ are ethoxy and $R_3$ is as described above; ethylene-bis-diethoxyphosphinyldithiocarbamate, trimethylene-bishdiethoxyphosphinyldithiocarbamate, propylene-bis-diethoxyphosphinyldithiocarbamate and oxydimethylene-bis-diethoxyphosphinyldithiocarbamate being among the most active of these materials.

The invention will be further illustrated in conjunction with the following examples.

Example 1

Preparation of Ethylene-bis-Diethoxyphosphinyldithiocarbamate

The sodium salt of ethanedithiol is obtained as a colorless solid by adding the dithiol to excess sodium methoxide in ethanol under nitrogen followed by addition thereto of benzene. It is washed with ethanol-benzene and then with ether and dried in vacuo. To a cooled (room temperature) mixture of 8.5 parts of diethoxyphosphinyl isothiocyanate in 100 parts (by volume) of benzene is added 3.0 parts of ethanedithiol sodium salt. After an hour, 10 parts (by volume) of the stirred mixture is removed and the very fine solids are spun down in the centrifuge and washed with one part of ether. The nuclear magnetic resonance spectrum in deuterium oxide shows a singlet at 6.80λ($-CH_2-S-$, 4H), a multiplet at 5.9λ($-CH_2-O-$, 8H), and a doublet at 8.68λ($CH_3-C$, 12H).

The remainder of the reaction mixture is mixed with water and the phases are separated. The benzene phase is washed several times with water. The combined water fractions are filtered, washed once with ether, poured into a flask, ice-cooled and acidified with 25 percent hydrochloric acid. The precipitated solids are washed several times with water and vacuum dried at 45° to 50° C. over potassium hydroxide leaving 8.7 parts (84 percent based on work-up of 90 percent of the intermediate salt) of pale yellow crystals, melting point 115° to 118° C. Recrystallization by dissolving 5.0 parts in ethanol with slight warming followed by dilution with two volumes of hexane and cooling to −20° C. gives 3.4 parts of very fine pale yellow crystals, melting point 120° to 125° C. at 1°/minute (dec.).

Analysis Calculated for $C_{12}H_{26}N_2O_6P_2S_4$: C, 29.74; H, 5.29; N, 5.78; P, 12.79; S, 26.47.

Found: C, 30.14; H, 5.13; N, 5.75; P, 12.65; S, 26.66.

The infrared spectrum shows strong maxima at 1240, 1280, 1480, and 3080 cm$^{-1}$, the latter two assignable to the

group. The nuclear magnetic resonance spectrum in deuterochloroform shows a doublet at 0.1λ($\nu$=8 ppm., N—H, 2H), a singlet at 6.40λ($-S-CH-$, 4H), a multiplet at 5.7$\nu$($-CH_2-O-$, 8H), and a triplet at 8.58λ($\nu$= 7 ppm., $CH_3-C$, 12H).

Utilizing the same procedure employed above to prepare ethylene-bis-diethoxyphosphinyldithiocarbamate but with the indicated substitution of reactants, the following analogs are prepared.

A. Preparation of Trimethylene-bis-Diethoxyphosphinyldithiocarbamate

By substituting propane-1,3-dithiol for ethanedithiol, melting point 89° to 90°C.

Analysis Calculated for $C_{13}H_{28}N_2O_6P_2S_4$: C, 31.31; H, 5.66; N, 5.62; P, 12.42; S, 25.72.

Found C, 31.29; H, 5.84; N, 5.79; P, 12.24; S, 25.48.

B. Preparation of Propylene-bis-Diethoxyphosphinyldithiocarbamate

By substituting propane-1,2-dithiol for ethanedithiol, melting point 114° to 115°C.

Analysis Calculated for $C_{13}H_{28}N_2O_6P_2S_4$: C, 31.31; H, 5.66; N, 5.62; P, 12.42; S, 25.72.

Found: C, 31.42; H, 5.80; N, 5.72; P, 12.64; S, 25.91.

C. Preparation of Ethylene-bis-Diethoxyphosphinothioyldithiocarbamate.

By substituting potassium diethoxyphosphinothioyldithiocarbamate, melting point 105° to 110°C.

Analysis Calculated for $C_{12}H_{26}N_2O_4P_2S_6$: C, 27.89; H, 5.07; N, 5.42; P, 11.99; S, 37.24.

Found: C, 28.00; H, 5.27; N, 5.60; P, 11.78; S, 37.20.

D. Preparation of Trimethylene-bis-Diethylphosphinyldithiocarbamate

By substituting diethylphosphinyl isothiocyanate for diethoxyphosphinyl isothiocyanate, and trimethylenedithiol sodium salt for ethanedithiol sodium salt, trimethylene-bis-diethylphosphinyldithiocarbamate was obtained in good yield.

E. Preparation of 2,3-Butylene-bis-Ethoxyphenylphosphinotioyldithiocarbarbamate.

Substituting ethoxyphenylphosphinothioyl isothiocyanate for diethoxyphosphinyl isothiocyanate, and 2,3-butanedithiol sodium salt for ethanedithiol sodium salt resulted in the formation of 2,3-butylene-bis-ethoxyphenylphosphino hioyldithiocarbamate in good yield.

F. Preparation of Tetramethylene-bis-Diphenylphosphinyldithiocarbamate

By substituting diphenylphosphinyl isothiocyanate for diethoxyphosphinyl isothiocyanate, and tetramethylenedithiol sodium salt for ethanedithiol sodium salt tetramethylene-bis-diphenylphosphinyldithiocarbamate was obtained in good yield.

EXAMPLE 2

Preparation of Oxydimethylene-bis-Diethoxyphosphinyldithiocarbamate

To an ice-cooled mixture of 0.9 part of bis-chloromethyl ether in 10 parts (by volume) of dry acetone is added 2.0 parts of potassium diethoxyphosphinyldithiocarbamate. After 30 minutes, the bath is removed and the mixture is stirred overnight. Filtration followed by concentration in vacuo gives 1.6 parts of yellow solids. The solids crystallize at room temperature from about 3:1 chloroform as pale yellow crystals, melting point 98.6° to 99.6° C., 1.1 parts (58 percent).

Analysis Calculated for $C_{12}H_{26}N_2O_7P_2S_4$: C, 28.79; H, 5.24; N, 5.60; P, 12.38; S, 25.62.

Found: C, 28.61; H, 5.30; N, 5.75; P, 12.12; S, 25.63.

The infrared spectrum shows bands at 1,480 cm$^{-1}$ and 3,050 cm$^{-1}$ attributable to the

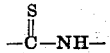

group and at 1,240 cm$^{-1}$ for the P = O function.

Substituting potassium ethoxyphenylphosphinyldithiocarbamate for the potassium diethoxyphosphoryldithiocarbamate results in the formation of the compound oxydimethylene-bis-ethoxyphenylphosphinyldithiocarbamate.

EXAMPLE 3

Testing was done in young mongrel dogs with natural or experimental infections of one or more of the following helminths: Hookworms—*Ancylostomum caninum*, *Uncinaria stenocephala*; Roundworms—*Toxocara canis*, *Toxascaris leonina*; Tapeworms—*Dipylidium caninum*, *Taenia pisiformis*. Dogs were determined to be infected by finding eggs in the feces in the case of the nematodes, and proglottids in the case of tapeworms.

Compounds were administered orally in gelatin capsule. Dogs were not starved prior to treatment.

After dogs were treated all feces were collected and washed through 80 mesh screens. Material retained in the screen was examined for worms which were identified and counted. Dogs were necropsied after their feces had been negative for worms for 2 days. At necropsy the worms remaining in the intestines were counted and numbered remaining compared with those passed to find percent efficacy of the compound. Dogs with tapeworm infections were held for at least 2 weeks following treatment before necropsy.

*D. caninum* scolices were either dissolved or so badly damaged by these compounds that they were not recovered from feces although other pieces of the worms were found. Therefore, it was not possible to know how many worms were passed by treated dogs. Most passed *T. pisiformis* scolices showed some damage such as some or all hooks missing or rostellum missing.

In the table, all dogs given the same dose are combined with the number of worms passed or retained listed being the total for all dogs at that dose. Dividing the number of worms passed plus number retained by the number of dogs would give the average worm burden per dog.

phenyl; X is a member selected from the group consisting of sulfur and oxygen and $R_3$ is a member selected from the group consisting of loweralkylene radical $C_1$–$C_4$ and oxydimethylene.

2. A method according to claim 1 wherein X is oxygen.

3. A method according to claim 2 wherein the host animal is of the family Canidae.

4. A method according to claim 1 wherein said compound is administered to said host animal orally at from 2.5 to 30 mg./kg. of body weight.

TABLE I

| Compound | Single oral dose, mg./kg. | Number of dogs | A. caninum | | | T. canis | | | T. leonina | | |
|---|---|---|---|---|---|---|---|---|---|---|---|
| | | | Number of worms | | Percent efficacy | Number of worms | | Percent efficacy | Number of worms | | Percent efficacy |
| | | | Passed | Retained | | Passed | Retained | | Passed | Retained | |
| Carbamic acid (diethoxyphosphinyl)dithioethylene ester | 5 | 1 | 16 | 4 | 80 | | | | 15 | 0 | 100 |
| Carbamic acid (diethoxyphosphinyl)dithiotrimethylene ester | 5 | 2 | 164 | 9 | 95 | | | | 62 | 3 | 95 |
| Carbamic acid (diethoxyphosphinyl)dithiopropylene ester | 5 | 2 | 146 | 9 | 89 | 1 | 0 | | 8 | 1 | 89 |
| Carbamic acid (diethoxyphosphinyl)dithiooxydimethylene ester | 5 | 1 | 0 | (a) | 0 | | | | 15 | (a) | | a No necropsy.

I claim:

1. A method for the control of helminths in warm-blooded animals comprising; administering to host animals in which helminth control is desired an anthelmintically effective amount of a compound having the formula:

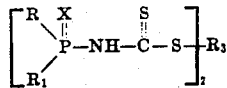

wherein R and $R_1$ each represent a member selected from the group consisting of loweralkyl $C_1$–$C_4$, loweralkoxy $C_1$–$C_4$ and 5. A method according to claim 1 wherein said compound is administered to said host animal orally at from 5.0 to 15 mg./kg. of body weight in a single dose.

6. A method according to claim 1 wherein said compound is administered to said host animal in multiple doses.

7. A method according to claim 1 wherein the compound is ethylene-bis-diethoxyphosphinyldithiocarbamate.

8. A method according to claim 1 wherein the compound is oxydimethylene-bis-diethoxyphosphinyldithiocarbamate.

9. A method according to claim 1 wherein the compound is trimethylene-bis-diethoxyphosphinyldithiocarbamate.

10. A method according to claim 1 wherein the compound is propylene-bis-diethoxyphosphinyldithiocarbamate.

* * * * *